C. Ellis.
Cutting Screws.
Nº 76,612.        Patented Apr. 14, 1868.
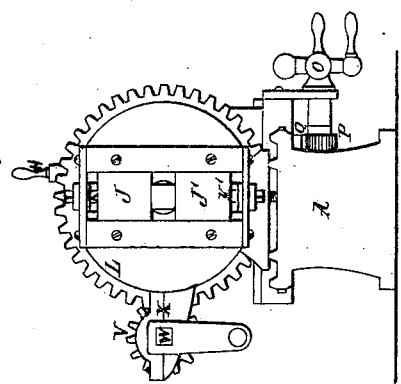
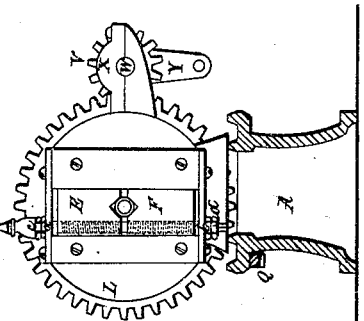
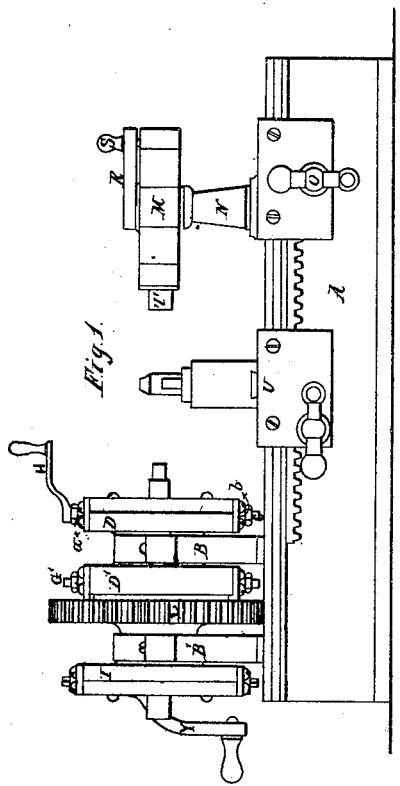
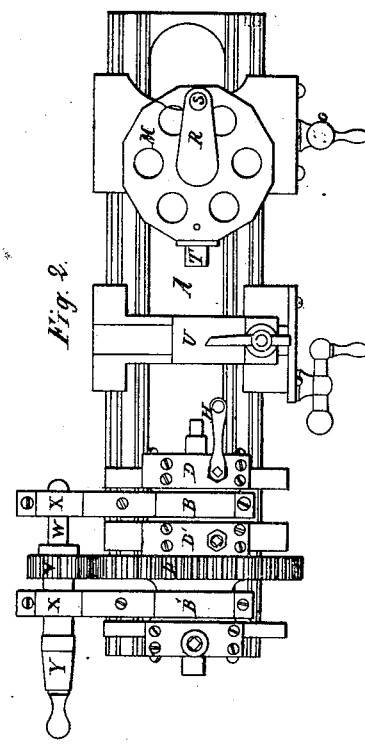
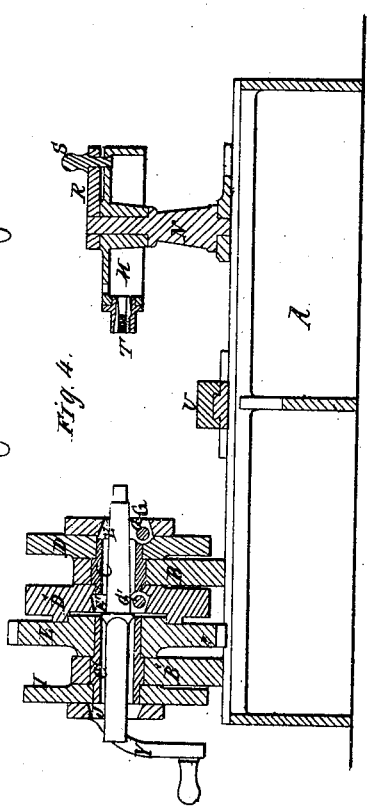
Witnesses
N.C. Lombard
Chas. A. Jordan
Inventor
Chas Ellis

United States Patent Office.

CHARLES ELLIS, OF CANTON, MASSACHUSETTS.

Letters Patent No. 76,612, dated April 14, 1868.

IMPROVEMENT IN SCREW-CUTTING LATHES.

*The Schedule referred to in these Letters Patent and making part of the same.*

TO ALL WHOM IT MAY CONCERN:

Be it known that I, CHARLES ELLIS, of Canton, in the county of Norfolk, and State of Massachusetts, have invented a new and useful Improvement in Lathes for Cutting Screws; and I do hereby declare the following to be a full, clear, and exact description of the same, reference being had to the accompanying drawings, making a part of this specification, in which—

Figure 1 is a front elevation of a lathe embodying my invention.

Figure 2 is a plan of the same.

Figure 3 is an end elevation.

Figure 4 is a vertical longitudinal section through the axis of the chuck.

Figure 5 is a transverse section on line $x\ x$ of fig. 4.

The object of my invention is to facilitate the cutting of the screw-threads on the ends of carriage-axles, and other similar operations, and consists—

First. In the application of two self-centring chucks arranged on a hollow spindle, in such a manner that both may be brought to bear upon the object to be centred, at pleasure.

Second. In the application of a third chuck, not self-centring, but having its jaws so arranged that they may be operated independently of each other, so that they may be adjusted to bear upon the rough or unfinished portion of the axle to clamp the same, whether it be straight or crooked, and its contact with the axle to insure its revolution, without danger of defacing the surface of the finished portion of the axle on which the self-centring chucks act.

Third. In the use, in combination with the above-mentioned centring and holding-chucks, of a revolving die-holder; and Fourth. In the use, in combination with the above-mentioned centring and holding-chucks and revolving die-holder, of a tool-post and carriage, so arranged that, when the axle is secured in the hollow spindle of the head-stock, the axle may be operated upon by the turning-tool, and the screw cut on it without removing it from the lathe.

In the drawings, A is the bed of the lathe, made in the usual form. B and B' are stands, bolted to the bed at or near one end, and serving the purpose of a head-stock to support the hollow spindle C and C'. D and D' are two self-centring chucks, mounted on the hollow spindle C, and made fast to it, so as to revolve with it. These chucks consist of circular disks, provided with dove-tailed grooves across their faces, in a line at right angles to the axis of their revolution, into which are fitted the jaws E and E' and F. These jaws are operated by means of the screws G and G', provided with right and left-hand threads, working in corresponding right and left-hand threads cut in the jaws. Said screws are provided with the adjusting-nuts or collars $a$ and $b$ and the chuck-nuts $c$ and $d$, by means of which the jaws in the chuck may be accurately adjusted, so that the centre between the two jaws shall exactly coincide with the axis of the chucks.

The screws are operated by the crank-wrench H. I is a third chuck, mounted on and made fast to the hollow spindle C', and provided with jaws J and J', similar in form to those in the centring-chucks D and D', but operated independently of each other, by means of the screws K and K'. L is a spur-gear, also mounted on and made fast to the spindle C', and also bolted firmly to the centring-chuck D', so that the two hollow spindles C and C' are thereby rigidly connected, and become in effect one hollow spindle.

M is the revolving die-holder, mounted on the column N, and fitted to move on the slides of the lathe-bed, and is fed to the work by means of the hand-crank O and the pinion P working in the rack Q. The die-holder is held in position by means of the rigid arm R and pin S. T is the die, and each face of the die-holder may be provided with a die of a different style or size, and adapted to do the various kinds of work desired.

U is the ordinary tool-carriage for turning off the end of the axle and the nut, and is fed to the work in the same manner as the die-holder.

The chucks are driven by the pinion V on the driving-shaft W, supported in the bearings X X. On the outer end of this shaft will be placed the driving-pulley, in the place of the crank Y shown in the drawings.

Although I have shown the above mode of driving the chucks, they may be driven in any other well-known way.

The operation of my machine is as follows: The axle is placed in the hollow spindle, when the jaws of the centring-chucks D and D' are drawn towards each other, by revolving the screws G and G', so that they grasp the turned portion of the axle, and bring the centre of the axle to coincide with the axis of revolution.

When this has been done, the jaws of the holding-chuck I are then set up to the axle, by turning the screws K and K', when it is ready to be operated upon, by the turning-tool or the die, at the pleasure of the operator.

The work of turning and cutting the screw does not differ materially from common practice, and need not be described.

I am aware that a self-centring chuck, with a single set of jaws, has been heretofore used, and therefore do not claim it as such; but

What I claim as my invention, and wish to secure by Letters Patent, is—

1. The holding-chuck I, in combination with the self-centring chucks, substantially as described.

2. The combination of the self-centring chucks D and D', the holding-chuck I, and the revolving die-holder M, substantially as described.

3. The combination of the chucks D and D' and I, the revolving die-holder M, and the tool-carriage U, when made substantially as described and for the purpose specified.

4. The adjusting-collars $a$ and $b$ and right and left screws G G', in combination with the sliding jaws of a chuck, so that the said jaws shall always have their corresponding faces at an equal distance from the centre of revolution.

5. The employment, in combination with the right and left screws G G', of the adjustable collars $a$ $b$, by which the jaws are centred, substantially as described.

Executed at Boston, this thirteenth day of November, 1867.

CHAS. ELLIS.

Witnesses:
N. C. LOMBARD,
CHAS. A. JORDAN.